United States Patent
Lee et al.

(10) Patent No.: US 7,860,884 B2
(45) Date of Patent: Dec. 28, 2010

(54) SYSTEM AND METHOD FOR PROCESSING CONTINUOUS INTEGRATED QUERIES ON BOTH DATA STREAM AND STORED DATA USING USER-DEFINED SHARED TRIGGER

(75) Inventors: Myung-Cheol Lee, Daejon (KR);
Hyun-Hwa Choi, Daejon (KR);
Mi-Young Lee, Daejon (KR);
Myung-Joon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 135 days.

(21) Appl. No.: 11/838,599

(22) Filed: Aug. 14, 2007

(65) Prior Publication Data

US 2008/0046401 A1 Feb. 21, 2008

(30) Foreign Application Priority Data

Aug. 21, 2006 (KR) .................. 10-2006-0078905

(51) Int. Cl.
*G06F 7/00* (2006.01)
(52) U.S. Cl. ...................... 707/769; 707/770
(58) Field of Classification Search ............ None
See application file for complete search history.

(56) References Cited

U.S. PATENT DOCUMENTS

| | | | | |
|---|---|---|---|---|
| 5,495,600 | A * | 2/1996 | Terry et al. ............ | 707/3 |
| 6,338,055 | B1 * | 1/2002 | Hagmann et al. .......... | 707/2 |
| 6,381,594 | B1 * | 4/2002 | Eichstaedt et al. ........ | 707/3 |
| 7,383,253 | B1 * | 6/2008 | Tsimelzon et al. ........ | 707/3 |
| 7,392,239 | B2 * | 6/2008 | Fontoura et al. ......... | 707/3 |
| 2003/0206100 | A1 * | 11/2003 | Richman et al. ......... | 340/506 |
| 2004/0220921 | A1 * | 11/2004 | Billock et al. .......... | 707/3 |
| 2005/0044063 | A1 | 2/2005 | Barsness et al. | |

(Continued)

FOREIGN PATENT DOCUMENTS

JP 2006-505792 2/2006

(Continued)

OTHER PUBLICATIONS

"Continual Queries for Internet Scale Event-Driven Information Delivery," by Liu et al IN: IEEE Transactions on Knowledge and Data Engineering, vol. 11, No. 4 (1999). Available at: IEEE.*

(Continued)

*Primary Examiner*—Neveen Abel Jalil
*Assistant Examiner*—Daniel Kinsaul
(74) *Attorney, Agent, or Firm*—Ladas & Parry LLP (57) ABSTRACT

Provided are a system and method for processing continuous integrated queries on both data stream and stored data using user-defined shared trigger. The system includes a data stream manager for managing data stream inputted from outside; a continuous integrated queries manager for managing the continuous integrated queries inputted from an external application; a trigger manager for managing the user-defined shared trigger inputted from the external application and registering the user-defined shared trigger in an external database; a trigger result manager for forming and managing a trigger result set from a performance result of the user-defined shared trigger registered in the cooperation database; and a continuous integrated queries performer for processing the continuous integrated queries referring to the transmitted data stream and trigger result set.

17 Claims, 8 Drawing Sheets

U.S. PATENT DOCUMENTS

2005/0097090 A1* 5/2005 Bird et al. ................ 707/3
2005/0198006 A1* 9/2005 Boicey et al. ............. 707/2
2006/0287984 A1* 12/2006 Chen et al. ............... 707/3

FOREIGN PATENT DOCUMENTS

KR 1020070060992 6/2007

OTHER PUBLICATIONS

"PSoup: A System for Streaming Queries over Streaming Data," by Chandrasekaran and Franklin IN: VLDB Journal 12: 140-156 (2003). Available at: ACM.*

"Towards an Integrated Model for Event and Stream Processing," by Jiang et al. IN: University of Texas at Arlington Technical Report (2004). Available at: http://cse2.uta.edu/Research/Publications/Downloads/CSE-2004-10.pdf Last visited: Aug. 19, 2009.*

"Query Processing for Streaming Sensor Data," by Madden, Samuel IN: Ph.D. Qualifying Exam Proposal, University of California, Berkeley (2002). Available at: http://db.lcs.mit.edu/madden/html/madden_quals.pdf Last Visited Aug. 19, 2009.*

"Extensible Name Service for a Micro-kernal Based System," by Chao et al. IN: IBM Technical Disclosure (1995). Available at: ip.com prior art database Last Visisted: Aug. 19, 2009.*

"Page Modification and Writing Coordinator," by Gregg and Satin. IN: IBM Technical Disclosure (1985). Available at: ip.com prior art database Last visited: Aug. 19, 2009.*

"NiagraCQ: A Scalable Continuous Query System for Internet Databases," by Chen et al. IN: ACM SIGMOD (2000). Available at ACM.*

"Conquer: A Continual Query System for Update Monitoring in the WWW," by Liu et al. (1999). Available at http://www.cc.gatech.edu/projects/disl/CQ/papers/jcs-final.pdf Last visited: Feb. 20, 2010.*

Korean Notice of Patent Grant dated Oct. 29, 2007 for the corresponding application KR-10-2006-0078905.

Daniel J. Abadi et al; "Aurora: a new model and architecture for data stream management."; The VLDB Journal (2003)/Digital Object Identifier (DOI) 10.1007/s00778-003-0095-z.

* cited by examiner

```
801 — FOR $t IN fn:collection('HistoricaldataSource')/Temperature
      RETURN
          <MaxTemp> { fn:max($t/data( ) ) } </Maxtemp>
```
} T1 — 802

FIG. 9

```
      USING "DataStreamSource" as $stream

FOR $r IN $stream/Building/Room,
      WHERE $r/Temperature >= uc:trigger('T1')/MaxTemp
901 — RETURN
          <REPORT>
          { $r/Number, $r/Temperature}
          </REPORT>
```

FIG. 10

1001 — void createTrigger(String TriggerName, String triggerStmt);

1002 — void dropTrigger(String triggerName, boolean cascade);

SYSTEM AND METHOD FOR PROCESSING CONTINUOUS INTEGRATED QUERIES ON BOTH DATA STREAM AND STORED DATA USING USER-DEFINED SHARED TRIGGER

CROSS-REFERENCE(S) TO RELATED APPLICATIONS

The present invention claims priority of Korean Patent Application No. 10-2006-78905, filed on Aug. 21, 2006, which is incorporated herein by reference.

BACKGROUND OF THE INVENTION

1. Field of the Invention

The present invention relates to a system and method for processing continuous integrated queries on both data stream and stored data using a user-defined shared trigger; and, more particularly, to a system and method for processing continuous integrated queries on both data stream and stored data using a user-defined shared trigger for improving overall performance by processing queries on storage data in real-time using a user-defined shared trigger when continuous queries integrating data stream, which is continuously inputted in real-time, and storage data, which are managed in a database, are processed, and reducing a time consumed for processing queries on storage data when continuous integrated queries are processed according to a method for sharing the performance result.

2. Description of Related Art

A ubiquitous computing environment requires a continuous queries process technology for processing data, which are continuously created from a Radio Frequency IDentification (RFID) sensor, Global Positioning System (GPS), diverse sensors including a temperature sensor and a humidity sensor, and diverse application programs, in real-time.

To take an example of a sensor network, the sensor network where light sensor nodes are connected through wireless communication can provide diverse application services for diverse ubiquitous environments including an environment monitoring of an area where people cannot monitor, automating home and office, preventing a crime of home and office, health monitoring, tracing of a mobile object, network monitoring, distribution and circulation, and web log.

Since data processed for diverse application services are continuously created and the quantity of the created data is changed every moment, it is required to process the data in real-time.

That is, in the ubiquitous computing environment, it is increasingly required to develop a data stream management system (DSMS) for processing continuous queries to recognize current status in real-time by continuously transmitting a new result with respect to queries registered by a user or an application.

However, it is difficult to exactly understand and determine the current status only by analyzing the data stream inputted in real-time under the ubiquitous computing environment. When an integrated analyzing process is performed based on history or related information, exact and higher value-added information can be acquired. Accordingly, the data stream management system supports the continuous integrated queries including historical data or related data of a predetermined storage, i.e., a database, as well as data stream inputted in real-time to provide higher value-added information to the user or the application through continuous queries.

In most research and development activities, continuous integrated queries are generally processed by adopting a push-based access method with respect to continuously inputted data stream and adopting a pull-based access method with respect to storage data of the database. In the data stream management system which should transmit the process result of the continuous integrated queries in real-time, a time for processing queries on storage data of the database is longer than a time for processing queries on data stream. Accordingly, when continuous integrated queries are processed, there is a problem that the process performance deteriorates.

That is, the data stream management system according to the conventional technology does not figure out whether the storage data of the database are changed. Accordingly, since the data stream management system adopts a pull-based access method for performing queries after connection with the database is adopted, the time for processing queries on storage data of the database is long and entire queries performance deteriorates.

A related art related to queries performance improvement in a data stream management system will be described in detail.

US Patent No. 2005-0044063 (reference 1), registered on Feb. 24, 2005, discloses a data query system load optimization. When a trigger recognizes the change of the database to optimize a queries process which is repeatedly performed in the relational database, the reference 1 can optimize the repeatedly performed queries in the relational database by re-performing the queries on the relational database in a data process engine and reusing a corresponding queries result in case of the same queries performance. Herein, the trigger senses only the change of the database.

The reference 1 is intended not for continuously inputted data stream, but for the relational database. Also, there is a limit that the queries result is reused only to the same queries.

Also, a technology for processing continuous queries on a data stream and a database based on a tuple inputted in real-time is proposed in an article (reference 2), entitled "Aurora: A New Model and Architecture for Data Stream Management", *VLDB Journal*, Vol. 12 No. 2, pp. 120-139, August 2003. The continuous queries processing technology performs an integrated queries process by using a pull-based access method through a connection point based on data of a general tuple concept. Accordingly, the integrated queries on data stream and storage data of the database inputted in real-time can be processed.

In case of the continuous queries processing technology, the technology's scope of application is limited to the data of the tuple concept and the data based on the relational database. Also, since the pull-based access method is adopted for the storage data of the database, there is a problem that performance deteriorates

SUMMARY OF THE INVENTION

An embodiment of the present invention is directed to providing a system and method for processing continuous integrated queries on both data stream and stored data using user-defined shared trigger to improve overall performance by processing queries on storage data in real-time using a user-defined shared trigger, when continuous queries are processed by integrating continuously inputted data stream and storage data of a database and sharing a performance result in diverse continuous integrated queries.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a system for processing continuous integrated queries on both data stream and stored data using a user-defined shared trigger, including: a data stream manager for managing data stream inputted from outside; a continuous integrated queries manager for managing the continuous integrated queries inputted from an external application; a trigger manager for managing the user-defined shared trigger inputted from the external application and registering the user-defined shared trigger in an external database; a trigger result manager for forming and managing a trigger result set from a performance result of the user-defined shared trigger registered in the cooperation database; and a continuous integrated queries performer for processing the continuous integrated queries referring to the transmitted data stream and trigger result set.

In accordance with another aspect of the present invention, there is provided a method for processing continuous integrated queries on both data stream and stored data using user-defined shared trigger in a continuous integrated queries process system, including the steps of: registering a user-defined shared trigger; registering continuous integrated queries referring to the registered user-defined shared trigger; forming and managing a trigger result set as a performance result of the registered user-defined shared trigger; receiving a data stream; and processing the continuous integrated queries by referring to the received data stream and the formed trigger result set.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

When continuous integrated queries on continuously inputted data stream and storage data of a database are processed, the present invention forms a trigger result by using user-defined shared trigger on storage data of the database and shares a trigger result in diverse continuous integrated queries. Accordingly, the present invention can prevent deterioration of performance due to a pull-based access method and improve entire queries performance.

Considering that data transmitted between an Internet and an application has an eXtensible Markup Language (XML) format, an XML data stream and an XML database will be described in detail as an example. However, it is notified that the present invention is not limited to the XML data stream and the XML database.

Figure 1:
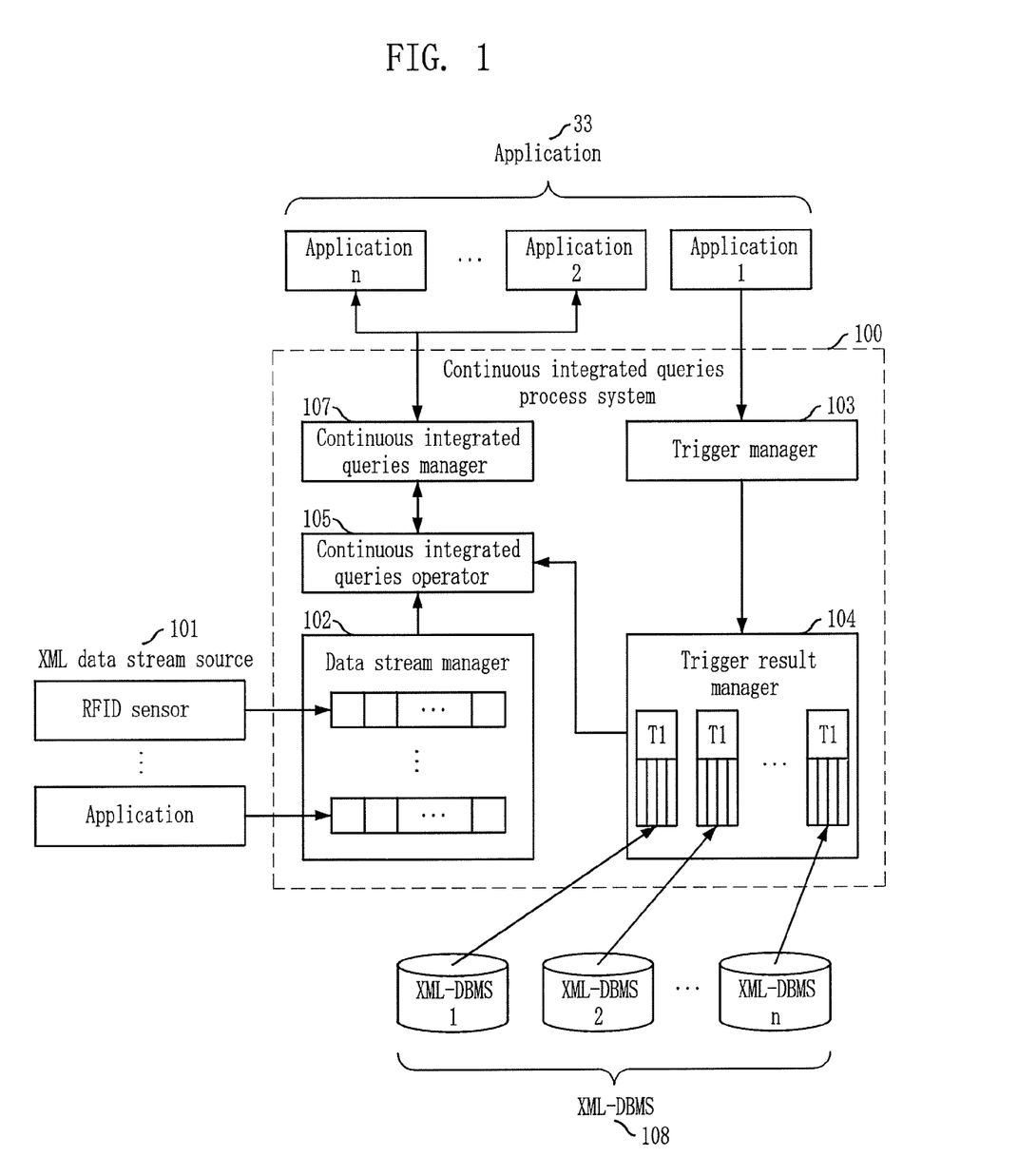
FIG. 1 is a block diagram showing a system for processing continuous integrated queries on both data stream and stored data using user-defined shared trigger in accordance with an embodiment of the present invention.

FIG. 1 is a block diagram showing a system for processing continuous integrated queries on both data stream and stored data using user-defined shared trigger in accordance with an embodiment of the present invention.

The system for processing continuous integrated queries on both data stream and stored data using user-defined shared trigger according to the present invention includes a data stream manager 102, a continuous integrated queries manager 107, a trigger manager 103, a trigger result manager 104, and a continuous integrated queries operator 105.

The data stream manager 102 manages an XML data stream continuously inputted in real-time from diverse external XML data stream sources 101. The continuous integrated queries manager 107 manages, i.e., registers and deletes continuous integrated queries defined and inputted from an external application 33. The trigger manager 103 manages a user-defined shared trigger defined and inputted from the external application 33 and registers and deletes the user-defined shared trigger in the XML database 108 as an XML trigger.

The trigger result manager 104 receives an XML trigger performance result on each of the storage data from the XML database 108, forms and manages a trigger result set. The continuous integrated queries operator 105 receives the XML data stream from the data stream manager 102, receives the trigger result set on the storage data from the trigger result manager 104, processes continuous integrated queries on the XML data stream and the storage data with reference to the trigger result set, and transmits the result to the external application 33.

The trigger result manager 104 receives an XML trigger performance result on each of the storage data in real-time from at least one XML database 108 which cooperates with a continuous integrated queries process system 100. Accordingly, the trigger manager 103 registers the user-defined shared trigger in each XML database 108 as an XML trigger and has the registered XML trigger automatically perform whenever the data in the inside of the XML database 108 is changed.

That is, the XML database 108 performs the pre-registered XML trigger when the data in the inside of the XML database 108 are changed. The XML database 108 transmits the trigger performance result to the trigger result manager 104 of the continuous integrated queries process system 100 in real-time. Accordingly, the trigger performance result shared when the continuous integrated queries process ends can be referred to. Also, deterioration of performance due to pull-based access to storage data of the database can be prevented.

The XML database 108 registers the XML trigger following a Query syntax structure in the inside according to an individual request, performs a queries sentence of the pre-registered XML trigger automatically according to the change, i.e., addition, update, and deletion, of the XML data, and provides the performance result to the trigger result manager 104 in real-time.

The trigger manager 103 is a constituent element for providing functions of registering and deleting the user-defined shared trigger. When the user-defined shared trigger is registered, the trigger manager 103 performs syntax analysis and justification checking process on a user-defined shared trigger sentence, performs a work according to the creation of the user-defined shared trigger, and builds an environment for the continuous integrated queries operator 105.

Also, when the user-defined shared trigger is deleted, the trigger manager 103 checks whether continuous integrated queries using the user-defined shared trigger exists and performs a related work. An operation related to registration and deletion of the user-defined shared trigger of the trigger manager 103 will be described in detail with reference to FIGS. 2 and 5.

The continuous integrated queries manager 107 is a constituent element for providing functions of registering and deleting the continuous integrated queries. When the continuous integrated queries are registered, the continuous integrated queries manager 107 performs syntax analysis and justification checking process of the continuous integrated queries and checks whether the corresponding continuous integrated queries refer to the user-defined shared trigger. Also, when the continuous integrated queries are deleted, the continuous integrated queries manager 107 checks the total number of users of the user-defined shared trigger and performs a related work.

Operation related to the registration and deletion of the continuous integrated queries of the continuous integrated queries manager 107 will be described in detail with reference to FIGS. 3 and 4.

The continuous integrated queries process system 100 receives an XML data stream continuously from the XML data stream sources 101 such as diverse sensors and applications including an external Radio Frequency Identification (RFID) sensor and can access to the storage data by cooperating with at least one XML database 108 for supporting the XML trigger. The continuous integrated queries process system 100 performs a continuous integrated queries process on the storage data of the received XML data stream and the XML database 108 and transmits the generated continuous integrated queries process result to other external application 33 in real-time.

Figure 2:
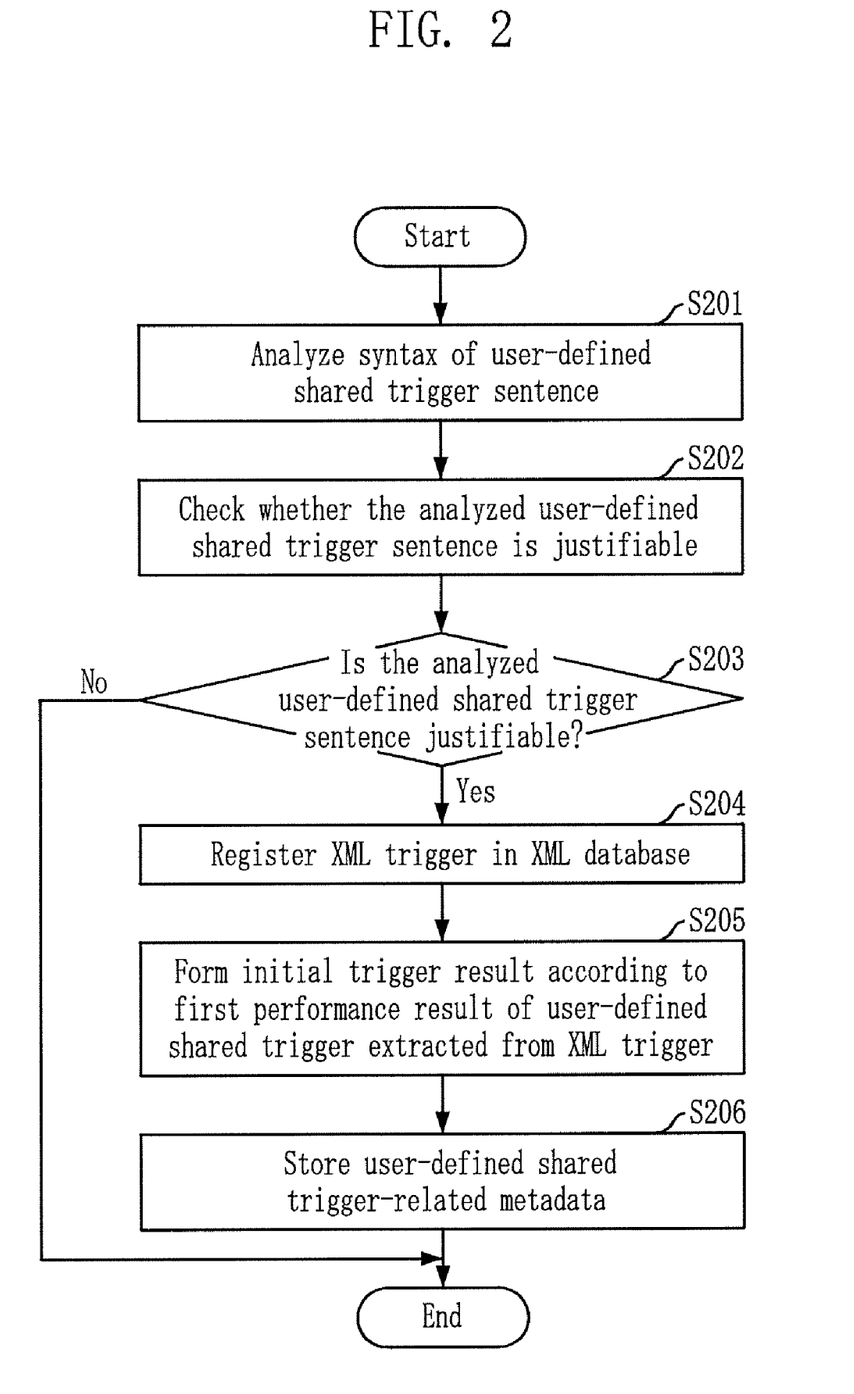
FIG. 2 is a flowchart describing a user-defined shared trigger registration procedure on storage data in a continuous integrated queries process system in accordance with an embodiment of the present invention.

FIG. 2 is a flowchart describing a user-defined shared trigger registration procedure on storage data in a continuous integrated queries process system in accordance with an embodiment of the present invention. FIG. 2 shows a procedure for registering a user-defined shared trigger on the storage data managed in the XML database.

The integrated queries process system 100 performs a syntax analyzing process on a user-defined shared trigger sentence based on a Query parser to be registered at step S201.

The integrated queries process system 100 checks and determines whether the syntax analyzed user-defined shared trigger sentence is justifiable at steps S202 and S203. Herein, it is checked through a syntax checking process whether a storage data source to register an XML trigger exists and whether designation on the data is efficient.

When it turns out that the user-defined shared trigger sentence is not justifiable, the logic flow ends. When the user-defined shared trigger sentence is justifiable, the user-defined shared trigger is registered in the XML database 108 as an XML trigger at step S204. At step S205, XQuery queries extracted from the XML trigger sentence are made to the XML database 108 to thereby form a first performance result of the user-defined shared trigger, i.e., an initial trigger result, are performed such that the initial trigger result is accessed when the continuous integrated queries are processed. The user-defined shared trigger-related metadata such as the user-defined shared trigger, the storage data source, and trigger result are stored at step S206.

The user-defined shared trigger, i.e., an XML trigger, registered through the above procedure is automatically performed whenever the data of the XML database 108 are changed individually from the continuous integrated queries processing operation of the continuous integrated queries process system 100. When the trigger performance result is transmitted to the trigger result manager 104 of the continuous integrated queries process system 100, the result of the user-defined shared trigger is updated. When the continuous integrated queries on the XML data stream and storage data of the XML database 108 are made, the continuous integrated queries process system 100 executes the queries onto the XML database 108 by referring to the result of the user-defined shared trigger.

Since the registered user-defined shared trigger can be referred to many continuous integrated queries, the performance of entire queries can be improved by sharing the trigger result in diverse continuous integrated queries.

Figure 3:
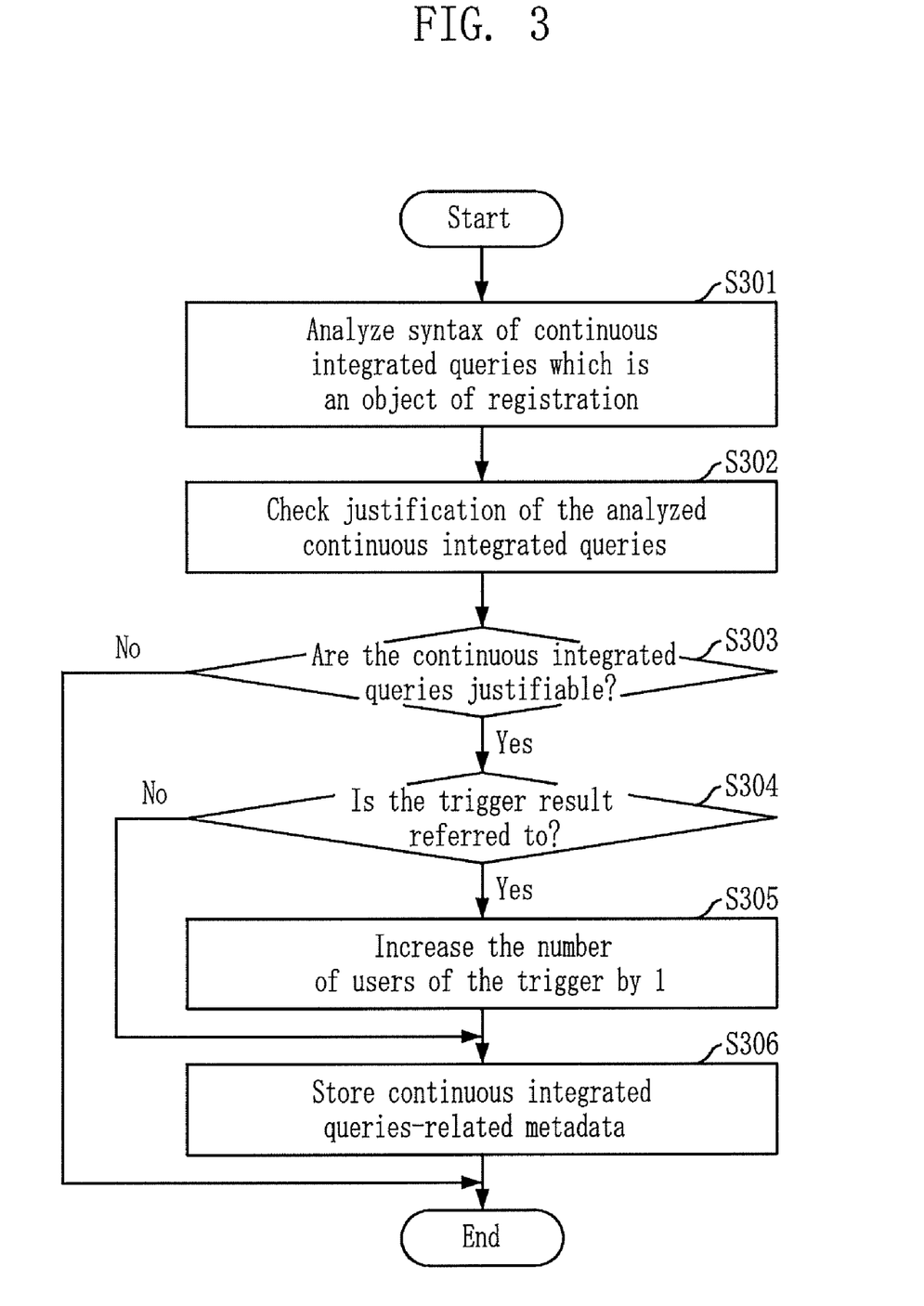
FIG. 3 is a flowchart describing a continuous integrated queries registration procedure on data stream and storage data in the continuous integrated queries process system in accordance with the embodiment of the present invention.

FIG. 3 is a flowchart describing a continuous integrated queries registration procedure on data stream and storage data in the continuous integrated queries process system in accordance with the embodiment of the present invention.

The continuous integrated queries process system 100 performs a syntax analyzing process on the continuous integrated queries, which is an object of registration, based on XQuery parser at step S301.

The continuous integrated queries process system 100 performs a justification checking process on the syntax analyzed continuous integrated queries at step S302 and determines at step S303 whether the continuous integrated queries are justifiable. Herein, it is checked through a syntax checking process whether a data stream source to be queried exists, whether a factor of the trigger result access function is a registered user-defined shared trigger name, and whether designation on the data is effective.

Figure 7:
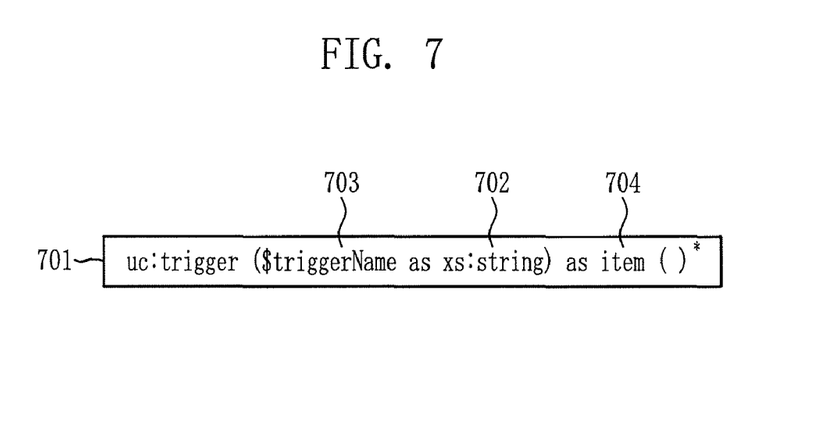
FIG. 7 describes definition on a trigger result access function suggested to access to the user-defined shared trigger result in the continuous integrated queries sentence in accordance with an embodiment of the present invention.

When it turns out at step S303 that the continuous integrated queries are not justifiable, the logic flow ends. Otherwise, it is checked at step S304 whether the trigger result is referred to and whether a trigger result access function of FIG. 7 is used in the continuous integrated queries sentence.

When it turns out at step S304 that the user-defined shared trigger result is referred to in the continuous integrated queries sentence, the number of users of the trigger increased by 1 at step S305. At step S306, storing continuous integrated queries-related metadata such as the continuous integrated queries, the data stream source, and the user-defined shared trigger are stored. Otherwise, the continuous integrated queries-related metadata excluding the user-defined shared trigger are stored at step S306.

The continuous integrated queries registered through the above procedures are repeatedly performed on the data stream inputted to the continuous integrated queries process system 100. As described above, a process on storage data is substituted by referring to the trigger result managed by the trigger result manager 104 according to the performance of the user-defined shared trigger.

Figure 4:
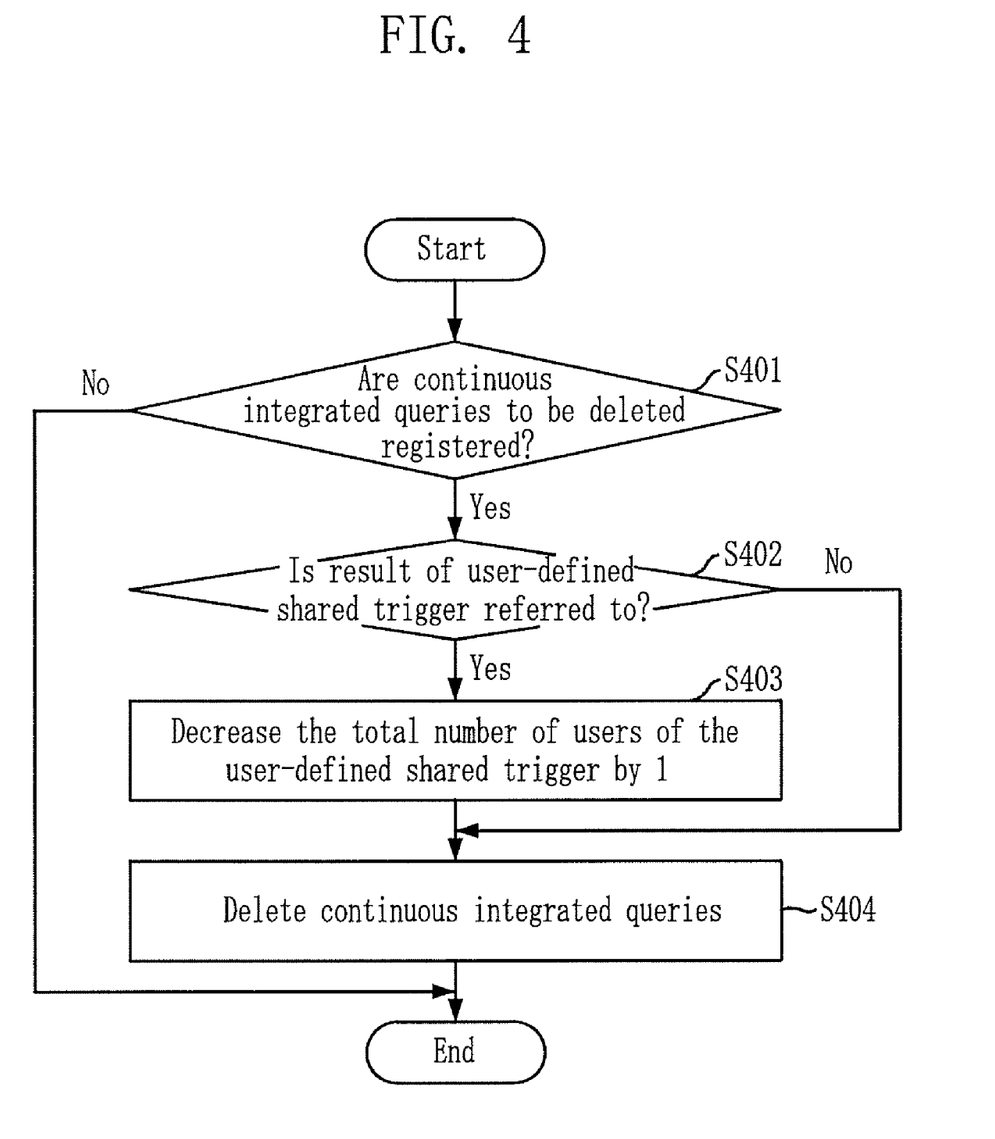
FIG. 4 is a flowchart describing a procedure for deleting the continuous integrated queries in the continuous integrated queries process system in accordance with the embodiment of the present invention.

FIG. 4 is a flowchart describing a procedure for deleting the continuous integrated queries in the continuous integrated queries process system in accordance with the embodiment of the present invention. It is determined at step S401 whether the continuous integrated queries to be deleted are registered.

When it turns out at step S401 that the continuous integrated queries do not exist, the logic flow ends. Otherwise, it is determined at step S402 whether the result of the user-defined shared trigger is referred to.

When the trigger result is referred to, the total number of users of the user-defined shared trigger decreases by 1 at step S403 and the corresponding continuous integrated queries are deleted at step S404. When the trigger result is not referred to, the continuous integrated queries are directly deleted at step S404.

Figure 5:
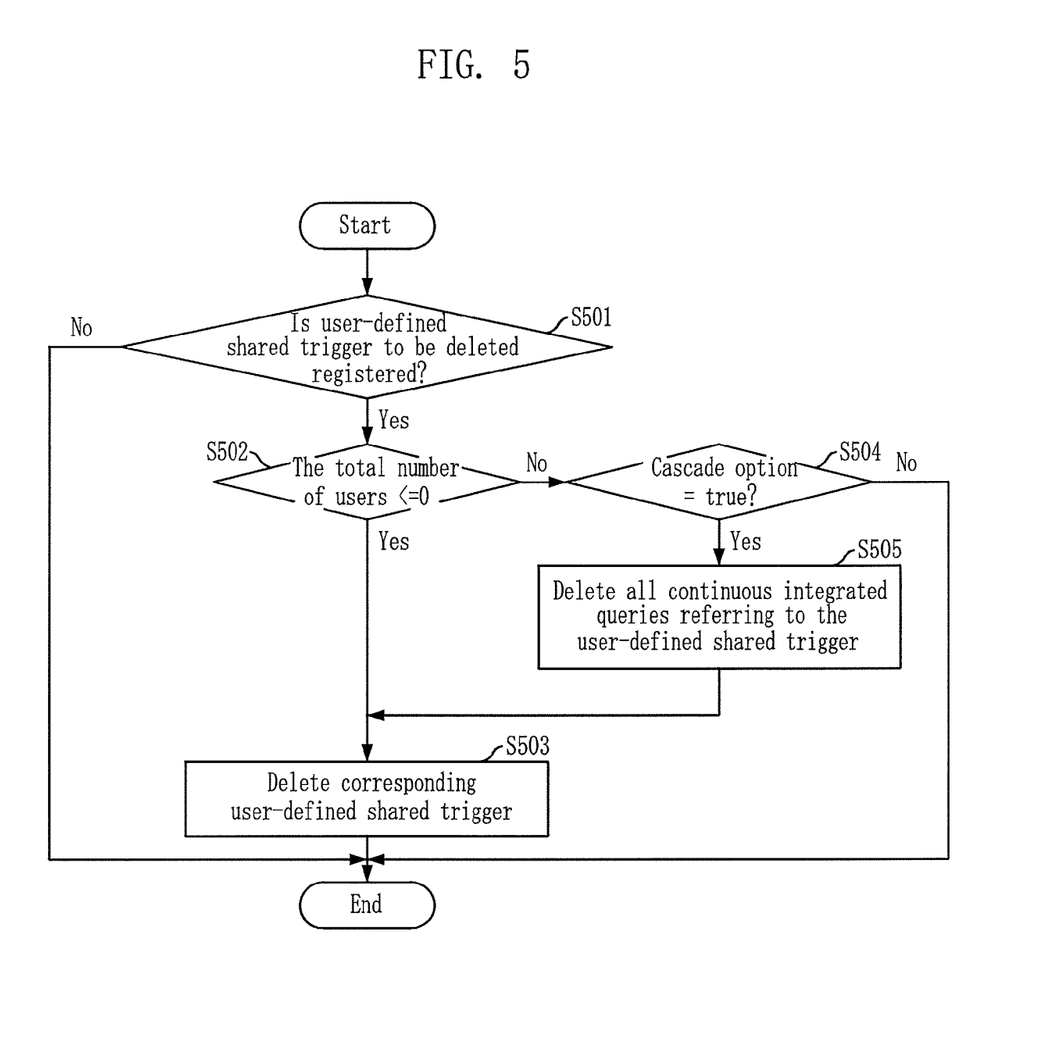
FIG. 5 is a flowchart describing a procedure for deleting the user-defined shared trigger in the continuous integrated queries process system in accordance with the embodiment of the present invention.

FIG. 5 is a flowchart describing a procedure for deleting the user-defined shared trigger in the continuous integrated queries process system in accordance with the embodiment of the present invention.

It is determined whether a user-defined shared trigger to be deleted is registered at step S501.

When it turns out at step S501 that the user-defined shared trigger does not exist, i.e., that the user-defined shared trigger are not registered, the logic flow ends.

When the user-defined shared trigger exists, it is checked at step S502 whether the total number of users of the trigger is smaller than or the same as 0.

When it turns out at step S502 that the total number of trigger users is smaller than or the same as 0, the corresponding user-defined shared trigger is deleted at step S503 and the logic flow ends. When the total number of users of the trigger is larger than 0, it is determined at step S504 whether a cascade option is true or false to determine a processing method according to the purpose of the user.

When it turns out at step S504 that the cascade option is false, the logic flow ends. When the cascade option is true, the logic flow ends after deleting all continuous integrated queries referring to the user-defined shared trigger at step S505 and deleting the user-defined shared trigger at step S503.

Herein, when the total number of users of the trigger is 1, it means that a user using the trigger exists. That is, the continuous integrated queries referring to the trigger or requiring the result of the trigger is registered.

As described above, the result of the user-defined shared trigger should be shared for diverse continuous integrated queries. That is, a trigger result access function having a name of the pre-registered trigger as a factor is used in the continuous integrated queries sentence such that the result of the user-defined shared trigger pre-existing when the continuous integrated queries are requested to be registered.

Sharing the user-defined shared trigger and the trigger result can optimize use of system resource.

Figure 6:
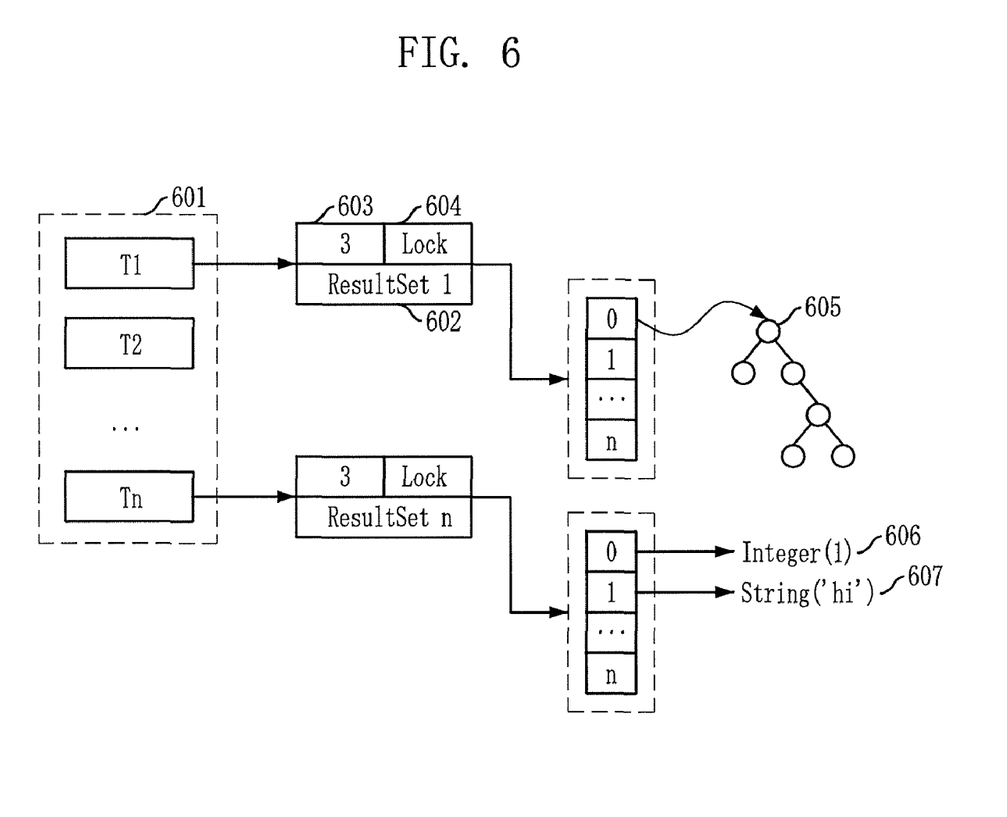
FIG. 6 shows data for managing a trigger result set, which is transmitted from a database to be shared in the continuous integrated queries the continuous integrated queries process system.

FIG. 6 shows data for managing a trigger result set, which is transmitted from a database to be shared in the continuous integrated queries the continuous integrated queries process system.

As shown in FIG. 6, a result set list 601 of the user-defined shared trigger includes the result sets of all user-defined shared triggers registered in the continuous integrated queries process system 100. A result set of a specific user-defined shared trigger is accessible through the name of the corresponding trigger. The name of the trigger is given according to input of the user through a user-defined shared trigger registration interface of FIG. 10. The name of the trigger should be unique in the continuous integrated queries process system 100.

Also, a result set 602 of a specific trigger includes information related to a result set performing a specific trigger sentence, the total number of users 603, and a lock 604 required for referring to/changing the result set.

The total number of users means the number of the total continuous integrated queries accessing to and using the result set of the trigger. The number of users is 0 when the trigger is created and the result set is formed. The number of users increases by 1 upon registration request of the continuous integrated queries referring to the corresponding trigger later on. Reversely, the number of users decreases by 1 upon request of deleting the continuous integrated queries referring to the trigger and it becomes possible to delete the trigger upon request of the user when the final number of users is 0.

Both of the continuous integrated queries and the XML database 108 of the continuous integrated queries process system 100 use the result set of the user-defined shared trigger. Herein, the continuous integrated queries can refer to, i.e., read, the result set of the user-defined shared trigger and the XML database 108 can change the result set of the user-defined shared trigger. When an operation process on the result set of the user-defined shared trigger is performed, a lock managing technique is adopted to prevent performing a reading process when the result set is changed or a changing process when the reading process is performed. That is, a lock 604 should be acquired to perform the reading or changing process. Also, when the reading or changing process ends, it should be prevented to simultaneously perform the reading and changing processes by releasing the lock. Since queries processes of the XML database 108 and the continuous integrated queries process system 100 are respectively performed, it generates a little overhead and the lock managing technique can be adopted.

Also, the result set 602 according to the performance of the user-defined shared trigger sentence may include all of a result 605 of a node tree type and results 606 and 607 of a basic type of an integer or a string.

FIG. 7 describes definition on a trigger result access function suggested to access to the user-defined shared trigger result in the continuous integrated queries sentence in accordance with an embodiment of the present invention.

As shown in FIG. 7, uc:trigger, which is a trigger result access function 701, receives a trigger name 703 of an xs:string type 702 as a factor and returns a result item 704 of at least 0 item type as a result.

According to an XQuery specification of world wide web consortium (W3C), the item type 704 is a union of a node( ) type and an xs:anyAtomicType type. As described in FIG. 6, the result of the uc:trigger function includes the node( ) type, the xs:anyAtomicType type, and the result item of the basic type.

In a uc:trigger function 701 of FIG. 7, binding is performed on a name space prefix uc to http://ubicore.etri.re.kr/xquery-functions, which is a name space Uniform Resource Identifier (URI).

The continuous integrated queries process system 100 according to the present invention defines and provides unique XQuery functions, which are not defined in an XQuery specification of W3C through the name space.

Figure 8:
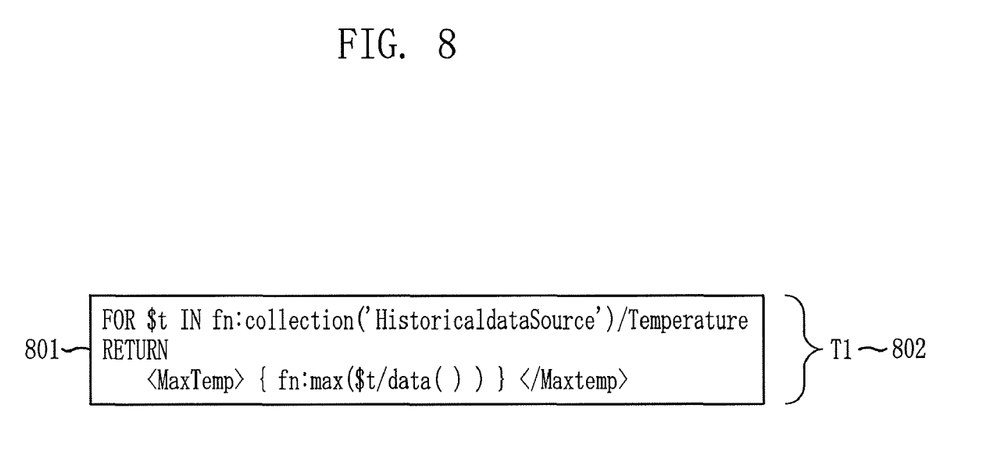
FIG. 8 shows a user-defined shared trigger sentence for registering a user-defined shared trigger in accordance with the embodiment of the present invention.

FIG. 8 shows a user-defined shared trigger sentence for registering a user-defined shared trigger in accordance with the embodiment of the present invention.

A user-defined shared trigger sentence 801 of FIG. 8 has a trigger name 802 called "T1" and a source having a name "HistoricalDataSource" is a name of a storage data source accessible by the XML database 108. Therefore, the contents of the trigger sentence are "HistoricalDataSource" means searching values of all Temperatures from the storage data source and returning the maximum value among the searched values. The XML database 108 receives the user-defined shared trigger as an XML trigger and registers the user-defined shared trigger in a database.

Subsequently, the continuous integrated queries process system 100 extracts an XQuery sentence for forming an initial result from the user-defined shared trigger and forms an initial trigger result. The user-defined shared trigger is created and then the user-defined shared trigger sentence is performed whenever the storage data source called "HistoricalDataSource" is added, deleted, and changed in the XML database 108. The trigger performance result is returned to the continuous integrated queries process system 100 and the trigger result is updated.

Figure 9:
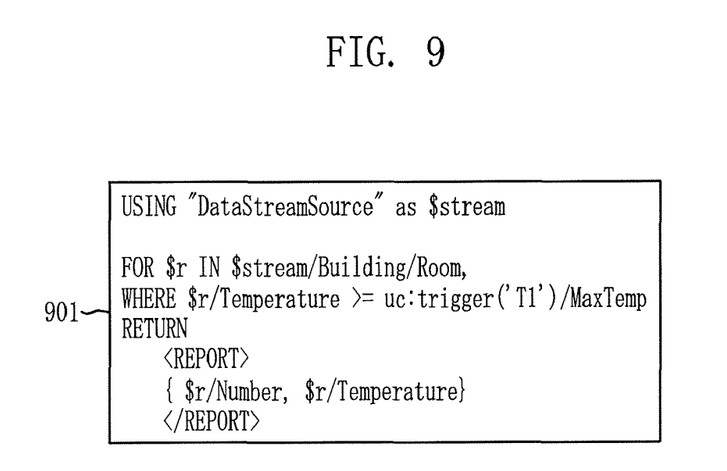
FIG. 9 shows a continuous integrated queries sentence in accordance with the embodiment of the present invention.

FIG. 9 shows a continuous integrated queries sentence in accordance with the embodiment of the present invention. As shown in FIG. 9, a continuous integrated queries sentence 901 on storage data of the XML data stream and the XML database 108 inputted to the continuous integrated queries process system 100 is as follows. A continuous integrated queries sentence 901 can form a "FLWOR" clause based on an XQuery. Whereas the general XQuery is formed base on a document, the continuous integrated queries process system 100 is performed based on the data source. Accordingly, a "USING" clause is extended. Each data source can be identified based on the name and it is possible to figure out whether the data source is a data stream source or a storage data source of an XML database.

The continuous integrated queries sentence 901 includes the contents of creating a room number and a current temperature as an element called "<REPORT>" and transmitting the element in case that a value of "/Building/Room/Temperature" from a data stream inputted from "DataStreamSource" is larger than a value of "/MaxTemp" in a result of a user-defined shared trigger T1 shown in FIG. 8, i.e., the maximum value of a temperature value stored in the XML database until now.

Figure 10:
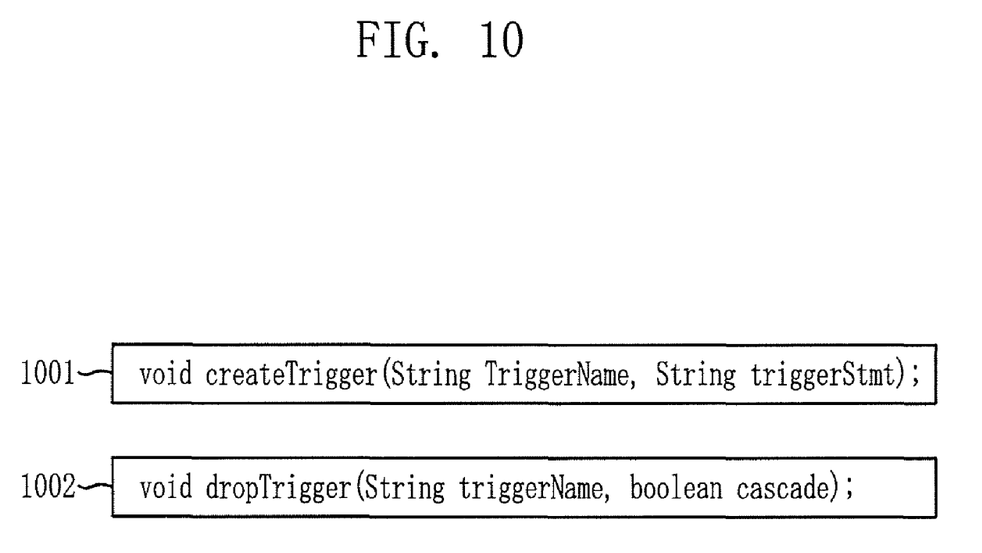
FIG. 10 shows an interface for registering and deleting the user-defined shared trigger in accordance with the embodiment of the present invention.

FIG. 10 shows an interface for registering and deleting the user-defined shared trigger in accordance with the embodiment of the present invention.

As shown in FIG. 10, a registration interface 1001 of the user-defined shared trigger has a method name of "createTrigger". The registration interface 1001 receives triggerName, which is a trigger name, and triggerStmt, which is a trigger sentence, as a factor, registers the user-defined shared trigger as a corresponding trigger name, and referring to the trigger name, thereby making it possible to share the trigger name in diverse continuous integrated queries.

A deletion interface 1002 of the user-defined shared trigger has a method name of "dropTrigger", receives the triggerName and a cascade option as a factor, and deletes the user-defined shared trigger having a corresponding trigger name. Accordingly, the cascade option can delete the user-defined shared trigger with the continuous integrated queries referring to the corresponding trigger according to the intention of the user.

The present invention can improve entire integrated queries process performance by outputting a queries result on storage data of the database based on a user-defined shared trigger in advance in processing of the continuous integrated queries on storage data of the data stream and the database in a continuous queries process system on the data stream and sharing the result in diverse continuous integrated queries.

That is, the present invention does not process storage data of the database according to the pull-based access method, but performs the trigger sentence of the user-defined shared trigger in real-time whenever the database are changed, outputs a result set in advance, and shares the result set in diverse continuous integrated queries, thereby reducing a processing time on storage data of the database. Accordingly, the present invention can improve the entire integrated queries process performance.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

What is claimed is:

1. A system for processing continuous integrated queries on both data stream and stored data using a user-defined shared trigger, comprising:

a data stream managing means for managing a data stream inputted from outside;

a continuous integrated queries managing means for managing the continuous integrated queries inputted from an external application by inputting a query, by checking the query for syntax and for a trigger result access function, and by registering the query into continuous integrated queries referring to a registered user defined shared trigger when the trigger result access function of the query is a registered user-defined shared trigger name and when a data stream source of the query exists;

an cooperation database for automatically sending trigger performance results in real-time when data from within the cooperation database changes;

a trigger managing means for managing the user-defined shared trigger inputted from the external application, for registering the user-defined shared trigger in the cooperation database, for deleting all continuous integrated queries that correspond to the user-defined shared trigger when a cascade option is true, for deleting the user-defined shared trigger when the cascade option is true, for not deleting all continuous integrated queries that correspond to the user-defined shared trigger when a cascade option is false, and for not deleting the user-defined shared trigger when the cascade option is false;

a trigger result managing means for forming and managing a trigger result set from a performance result of the user-defined shared trigger registered in the cooperation database; and a continuous integrated queries performing means for processing the continuous integrated queries referring to the transmitted data stream and trigger result set.

2. The system as recited in claim 1, wherein when the continuous integrated queries performing means processes the transmitted data stream and the continuous integrated queries on storage data of the cooperation database, the continuous integrated queries performing means processes the continuous integrated queries referring to a pre-processed trigger result set with respect to the storage data of the cooperation database.

3. The system as recited in claim 1, wherein the trigger result managing means receives a performance result of the automatically performed registered user-defined shared trigger from the cooperation database whenever each of storage data of the cooperation database is changed, and forms and manages the trigger result set.

4. The system as recited in claim 3, wherein the trigger result managing means manages information related to a trigger sentence performance result set of the user-defined shared trigger, the total number of users, and a lock required for referring to or changing the trigger result set.

5. The system as recited in claim 4, wherein the trigger result managing means uses a lock technique when an operation on a result set of the user-defined shared trigger is performed, performs an operation when the lock is acquired, and releases the lock after the operation is completely performed.

6. The system as recited in claim 3, wherein when the trigger managing means provides functions of registering and deleting the user-defined shared trigger, the trigger managing means performs syntax analyzing and justification checking processes on a user-defined shared trigger sentence in registering of the user-defined shared trigger, builds an environment for the continuous integrated queries performing means according to creation of the user-defined shared trigger, checks whether the continuous integrated queries using the user-defined shared trigger exist when the user-defined shared trigger is deleted, and performs a deleting function according to the result.

7. The system as recited in claim 6, wherein when the user-defined shared trigger is requested to be deleted, the trigger managing means deletes the user-defined shared trigger in case that the number of the continuous integrated queries referring to the user-defined shared trigger to be deleted is smaller than or the same as 0, determines a value of a cascade option to determine intention of the user in case that the number of continuous integrated queries referring to the user-defined shared trigger to be deleted is larger than 0, deletes all continuous integrated queries referring to the corresponding user-defined shared trigger and user-defined shared trigger in case that the cascade option is true, and ends the continuous integrated queries referring to the corresponding user-defined shared trigger and user-defined shared trigger without deleting in case that the cascade option is false.

8. The system as recited in claim 3, wherein when the continuous integrated queries managing means provides functions of registering and deleting the continuous integrated queries, the continuous integrated queries managing means performs a syntax analyzing function and a justification checking function on the continuous integrated queries in registering of the continuous integrated queries, increases the total number of users of the user-defined shared trigger by 1 as the continuous integrated queries refer to the user-defined shared trigger, and decreases the total number of users of the user-defined shared trigger referred to in the continuous integrated queries in deleting of the continuous integrated queries.

9. A method for processing continuous integrated queries on both a data stream and an external cooperation database coupled to a continuous integrated queries process system, comprising the steps of:

defining a user-defined shared trigger in the cooperation database that automatically triggers the cooperation database to transmit during real-time a database trigger performance result when data from within the cooperation database changes;

registering the user-defined shared trigger in a trigger manager unit of the system;

inputting from an cooperation application a query into a continuous integrated queries manager;

checking the query for syntax and for a trigger result access function;

registering the checked query into continuous integrated queries referring to the registered user-defined shared trigger when the trigger result access function of the checked query is a registered user-defined shared trigger name and when a data stream source of the query exists;

forming and managing a trigger result set as a performance result of the registered user-defined shared trigger;

receiving the data stream;

processing the continuous integrated queries by referring to the received data stream and the formed trigger result set; and deleting all continuous integrated queries that correspond to the user-defined shared trigger when a cascade option is true;

deleting the user-defined shared trigger when the cascade option is true;

not deleting all continuous integrated queries that correspond to the user-defined shared trigger when a cascade option is false, and not deleting the user-defined shared trigger when the cascade option is false.

10. The method as recited in claim 9, further comprising the step of checking whether continuous integrated queries using the user-defined shared trigger exists subsequent to a deletion request of the registered user-defined shared trigger and performing a deleting function according to a result.

11. The method as recited in claim 10, further comprising the step of checking whether the user-defined shared triggers referred to the continuous integrated queries exists subsequent to deletion request of the registered continuous integrated queries and performing the deleting function according to the result.

12. The method as recited in claim 9, wherein when the continuous integrated queries on storage data of the external cooperation database and the inputted data stream are processed in the step of processing the continuous integrated queries, the continuous integrated queries are processed with respect to the storage data referring to the trigger result set of the pre-processed step of forming and managing a trigger result set.

13. The method as recited in claim 12, wherein in the forming and managing step is automatically performed whenever data from within the cooperation database changes.

14. The method as recited in claim 13, wherein the checking step includes the steps of:
analyzing syntax of the query; and
checking justification of the syntax of the query.

15. The method as recited in claim 13, wherein the registering step includes the steps of:
increasing the total number of user-defined shared triggers; and storing metadata related to the continuous integrated queries.

16. A non-transitory computer-readable recording medium contained thereon coded instructions for carrying out processing continuous integrated queries on both a data stream and an external cooperation database coupled to a continuous integrated queries process system, the computer-readable recording medium comprising:

coded instructions for defining a user-defined shared trigger in the cooperation database that automatically triggers the cooperation database to transmit during real-time a database trigger performance result when data from within the cooperation database changes;

coded instructions for registering the user-defined shared trigger in a trigger manager unit of the system;

coded instructions for inputting from an cooperation application a query into a continuous integrated queries manager;

coded instructions for checking the query for syntax and for a trigger result access function;

coded instructions for registering the checked query into continuous integrated queries referring to the registered user-defined shared trigger when the trigger result access function of the checked query is a registered user-defined shared trigger name and when a data stream source of the query exists;

coded instructions for forming and managing a trigger result set as a performance result of the registered user-defined shared trigger;

coded instructions for receiving the data stream; and coded instructions for processing the continuous integrated queries by referring to the received data stream and the formed trigger result set.

17. The non-transitory computer-readable recording medium of claim 16 wherein computer-readable recording medium is selected from the group consisting of a CD-ROM, a RAM, a ROM, a floppy disk, a hard disk and a magneto-optical disk.

* * * * *